T. BERRIDGE.
SHEARS FOR SHEET AND PLATE-METAL.
No. 170,658. Patented Dec. 7, 1875.
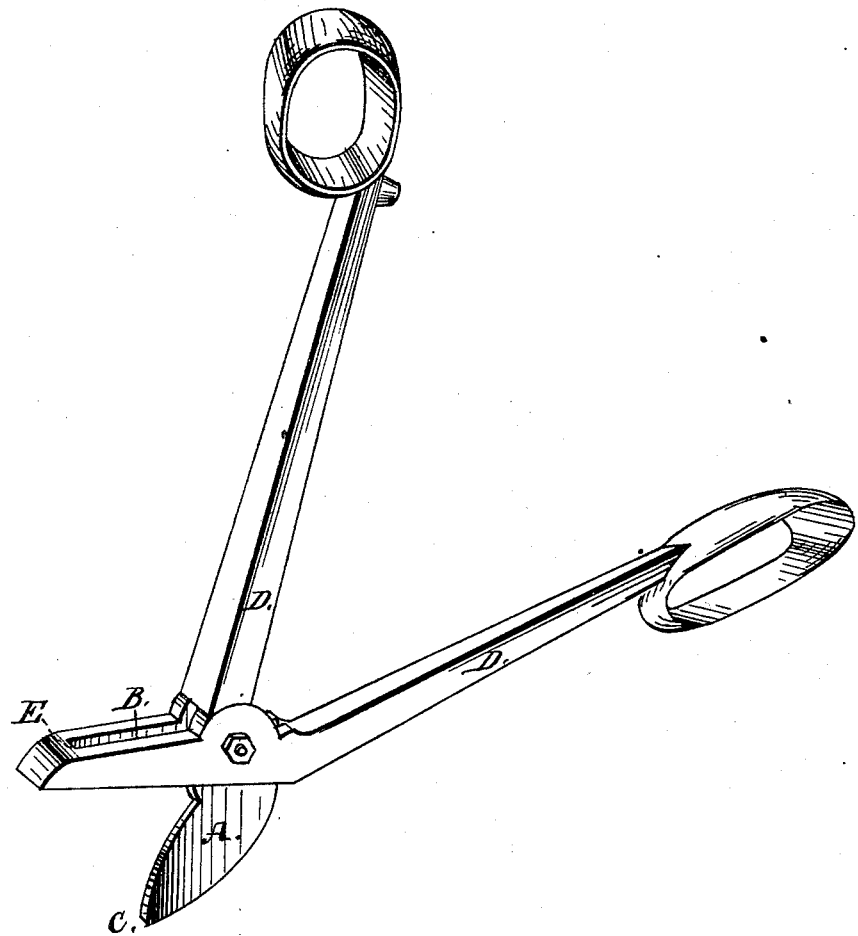
Witnesses:
William M. Loughlin
E. W. Pendleton
Inventor:
Thomas Berridge

UNITED STATES PATENT OFFICE.

THOMAS BERRIDGE, OF STURGIS, MICHIGAN.

IMPROVEMENT IN SHEARS FOR SHEET AND PLATE METAL.

Specification forming part of Letters Patent No. 170,658, dated December 7, 1875; application filed October 11, 1875.

*To all whom it may concern:*

Be it known that I, THOMAS BURRIDGE, of Sturgis, St. Joseph county, State of Michigan, have invented certain Improvements in Sheet and Plate Metal Shears or Cutters, of which the following is a specification:

The object of my invention is to cut or separate any plate or sheet metal, box, pipe, cone, or cylinder, or any other form of sheet or plate metal, in any direction, without displacement or injury to the cut edges of such form or material; and my invention consists, mainly, in a novel combination of a cutter having a plane or concave upper surface, acting as a double-cutting shears in a suitable rectangular slot, as shown in accompanying drawing, and hereinafter more fully described.

The point C of cutter A being first inserted into the object to be cut, the handles D D are operated like those of common shears. The result is, that the cutter A, playing closely yet freely in and out of slot B, makes two cuts, forcing at the same time a strip of the metal operated on through slot B at the point E, which operation, being continued, results in separating the object cut without injury or displacement to the cut edges thereof. Cutter A is formed of steel or other hardened metal, and has a plane or concave upper surface, with sharp edges and a solid point, and plays freely in slot B, which is also of steel or other hardened metal, and formed of plane surfaces and rectangular edges, cutter A and slot B being connected by a rivet or bolt with head and nut, and the whole operated by handles D D, similar to common shears.

I claim as my invention—

The double-cutting shears for sheet and plate metal, consisting of cutter A, with plane or concave upper surface, and a rectangular slot, B, in which the cutter operates, thereby making a double cut, substantially in the manner and for the purpose herein shown and described.

THOMAS BERRIDGE.

Witnesses:
WM. McLOUGHLIN,
E. W. PENDLETON.